United States Patent
Goto et al.

(10) Patent No.: US 12,422,703 B2
(45) Date of Patent: Sep. 23, 2025

(54) ISOLATOR AND ISOLATOR MANUFACTURING METHOD

(71) Applicants: KYOCERA Corporation, Kyoto (JP); Toyohashi University of Technology, Aichi (JP)

(72) Inventors: Taichi Goto, Sendai (JP); Tomoya Sugita, Machida (JP); Yasuyuki Tamba, Hirakata (JP); Hiroaki Inoue, Akashi (JP)

(73) Assignees: KYOCERA Corporation, Kyoto (JP); Toyohashi University of Technology, Aichi (JP)

( * ) Notice: Subject to any disclaimer, the term of this patent is extended or adjusted under 35 U.S.C. 154(b) by 291 days.

(21) Appl. No.: 18/190,730

(22) Filed: Mar. 27, 2023

(65) Prior Publication Data

US 2023/0324727 A1    Oct. 12, 2023

(30) Foreign Application Priority Data

Mar. 29, 2022  (JP) ................. 2022-054656

(51) Int. Cl.
G02F 1/095   (2006.01)
G02F 1/21    (2006.01)
G02F 1/225   (2006.01)

(52) U.S. Cl.
CPC ............ G02F 1/0955 (2013.01); G02F 1/212 (2021.01); G02F 1/225 (2013.01)

(58) Field of Classification Search
CPC ............................. G02F 1/0955; G02F 1/212
See application file for complete search history.

(56) References Cited

U.S. PATENT DOCUMENTS 7,664,346 B2     2/2010   Mizumoto et al.
2009/0034909 A1*  2/2009   Mizumoto ............. G02B 6/125
                                                     385/42

FOREIGN PATENT DOCUMENTS

WO        2007/083419 A1    7/2007

* cited by examiner

*Primary Examiner* — Chad H Smith
(74) *Attorney, Agent, or Firm* — Studebaker Brackett PLLC (57) ABSTRACT

An isolator includes a substrate, a waveguide and an electronic circuit disposed above the substrate, and a non-reciprocal member disposed above the waveguide and the electronic circuit. The non-reciprocal member includes a first portion in contact with the waveguide and a second portion disposed within a predetermined range from the electronic circuit. Non-reciprocity in the second portion is weaker than non-reciprocity in the first portion.

6 Claims, 9 Drawing Sheets

ISOLATOR AND ISOLATOR MANUFACTURING METHOD

CROSS REFERENCES TO RELATED APPLICATIONS

This application claims the benefit of priority to Japanese Patent Application No. 2022-54656 (filed on Mar. 29, 2022), the entire disclosure of which is incorporated herein by reference.

BACKGROUND OF THE INVENTION

1. Field of the Invention

The present disclosure relates to an isolator and an isolator manufacturing method.

2. Description of the Related Art

Optical isolators including a layer of magneto-optic material (Ce:YIG) as a waveguide layer are known (see, e.g., International Publication No. 2007/083419).

SUMMARY OF THE INVENTION

In an embodiment of the present disclosure, an isolator includes a substrate, a waveguide and an electronic circuit disposed above the substrate, and a non-reciprocal member disposed above the waveguide and the electronic circuit. The non-reciprocal member includes a first portion in contact with the waveguide and a second portion disposed within a predetermined range from the electronic circuit. Non-reciprocity in the second portion is weaker than non-reciprocity in the first portion.

In another embodiment of the present disclosure, an isolator manufacturing method includes forming a waveguide and an electronic circuit above a substrate, forming a non-reciprocal member above the waveguide and the electronic circuit, and irradiating a region of the non-reciprocal member with laser light. The irradiated region of the non-reciprocal member includes a portion in contact with the waveguide and does not include a portion disposed within a predetermined range from the electronic circuit.

DESCRIPTION OF THE PREFERRED EMBODIMENTS

Exemplary Configuration of Isolator 10

Figure 1:
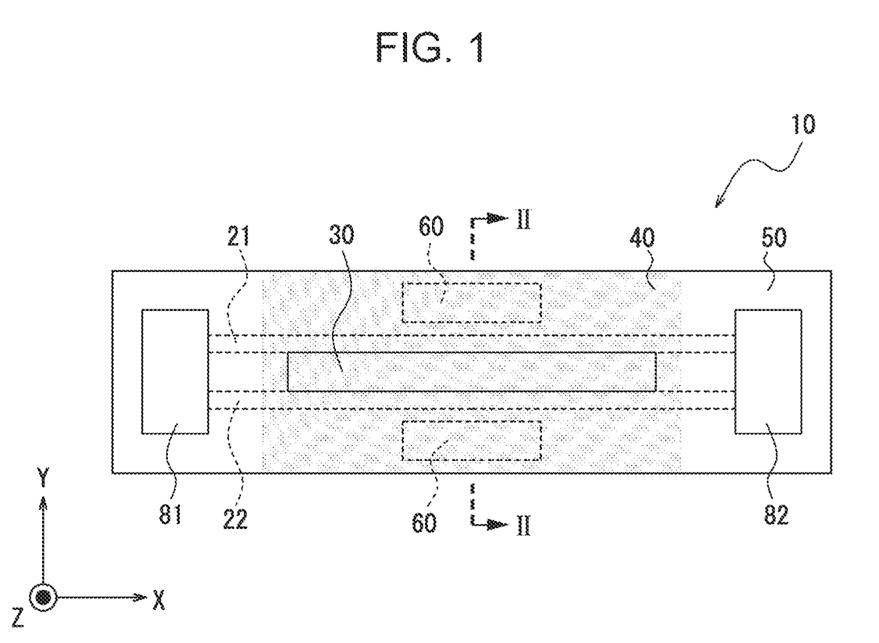
FIG. 1 is a plan view illustrating an exemplary configuration of an isolator according to an embodiment.
Figure 2:
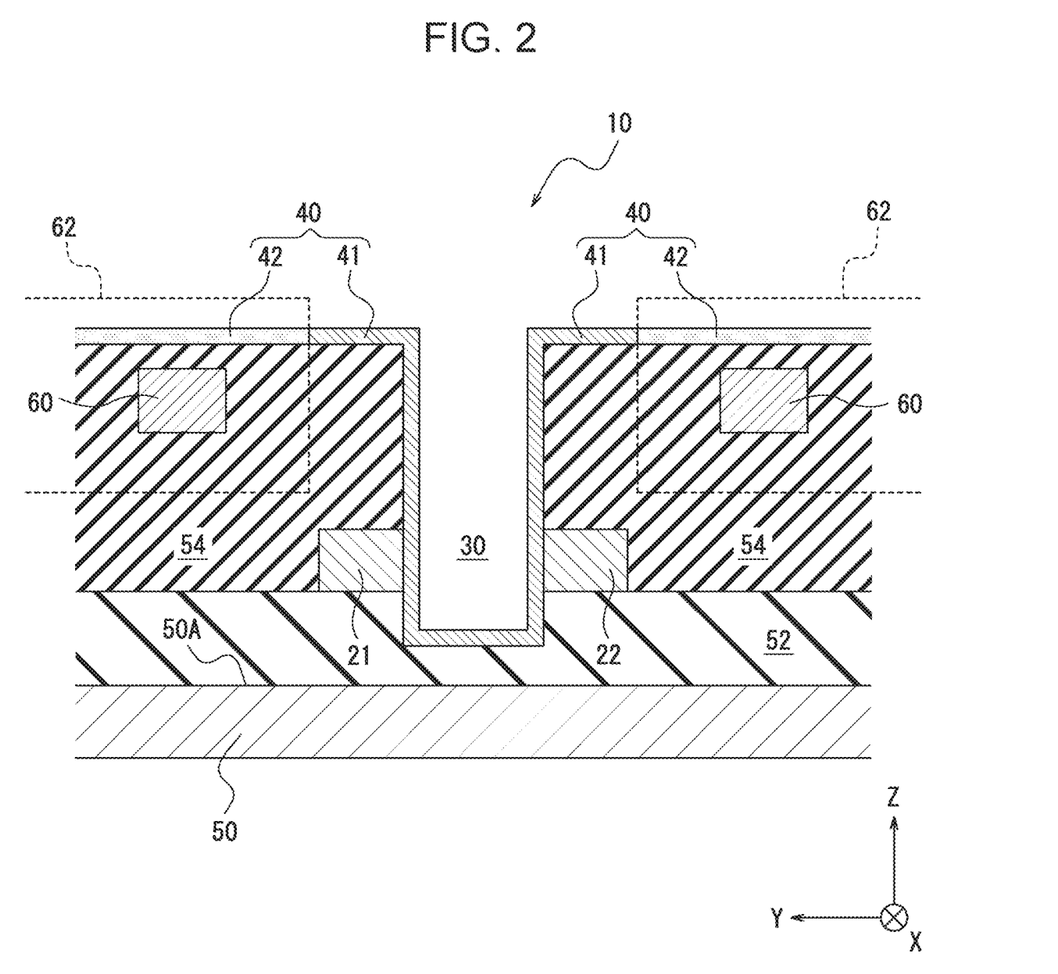
FIG. 2 is a cross-sectional view taken along line II-II in FIG. 1.

As illustrated in FIG. 1 and FIG. 2, in an embodiment, an isolator 10 includes a first waveguide 21, a second waveguide 22, a non-reciprocal member 40, a first branching unit 81, and a second branching unit 82 disposed above a substrate 50. The first waveguide 21 and the second waveguide 22 are also simply referred to as waveguides. A non-reciprocal material is a material that receives different effects from matter depending on the direction of propagation of light, because of a magneto-optic effect.

The isolator 10 is configured to allow transmission of a transverse electric (TE) mode electromagnetic wave received at the first branching unit 81 to the second branching unit 82, and block transmission of a TE mode electromagnetic wave received at the second branching unit 82 to the first branching unit 81. A direction of propagation of an electromagnetic wave from the first branching unit 81 to the second branching unit 82 is also referred to as a first direction. A direction of propagation of an electromagnetic wave from the second branching unit 82 to the first branching unit 81 is also referred to as a second direction. That is, the isolator 10 allows transmission of a TE mode electromagnetic wave in the first direction, and blocks transmission of a TE mode electromagnetic wave in the second direction.

An electromagnetic wave received at the first branching unit 81 of the isolator 10 is emitted from a light source. The light source may be disposed above the substrate 50. An electromagnetic wave to be output from the second branching unit 82 of the isolator 10 is converted to a signal by a modulator. The signal generated by the conversion in the modulator is transmitted to the outside by a high-frequency transmission circuit. The modulator or the high-frequency transmission circuit may be disposed above the substrate 50. The light source, and the modulator or the high-frequency transmission circuit, are collectively referred to as an electronic circuit 60.

The isolator 10 achieves asymmetric propagation characteristics of electromagnetic waves by using the principle of asymmetric Mach-Zehnder interferometers. The isolator 10 is configured in such a way that the phase shift of an electromagnetic wave propagating through the first waveguide 21 in the first direction is the same as the phase shift of an electromagnetic wave propagating through the second waveguide 22 in the first direction. The isolator 10 is also configured in such a way that the phase shift of an electromagnetic wave propagating through the first waveguide 21 in the second direction and the phase shift of an electromagnetic wave propagating through the second waveguide 22 in the second direction have a difference equivalent to ¼ of a wavelength (or equivalent to a 90-degree phase).

A phase shift can be adjusted by varying the line length of a waveguide, and can also be adjusted by varying the effective refractive index of the waveguide. The isolator 10 is configured in such a way that in the absence of the non-reciprocal member 40, the phase of an electromagnetic wave propagating through the first waveguide 21 is advanced by 90 degrees with respect to the phase of an electromagnetic wave propagating through the second waveguide 22. In the absence of the non-reciprocal member 40, the phase of an electromagnetic wave propagating through the first waveguide 21 is advanced by 90 degrees with respect to the phase of an electromagnetic wave propagating through the second waveguide 22, regardless of whether the direction of propagation of the electromagnetic wave through the isolator 10 is the first direction or the second direction. This means that even when simply the line length or the effective refractive index of the waveguide is set, the phase shift of an electromagnetic wave propagating in the first direction and the phase shift of an electromagnetic wave propagating in the second direction are the same. To create a difference between the phase shift of an electromagnetic wave propagating through the waveguide in the first direction and the phase shift of an electromagnetic wave propagating through the waveguide in the second direction, the isolator 10 includes the non-reciprocal member 40 disposed along at least part of the waveguide. With the non-reciprocal member 40, the waveguide functions as a non-reciprocal waveguide when applied with a magnetic field.

The non-reciprocal waveguide advances or delays the phase of an electromagnetic wave propagating therethrough. In the present embodiment, the isolator 10 is configured in such a way that when the non-reciprocal member 40 is located to the right of the waveguide as viewed in the propagation direction of an electromagnetic wave, the phase of the electromagnetic wave is delayed by ⅛ of the wavelength (or by 45 degrees). The isolator 10 is also configured in such a way that when the non-reciprocal member 40 is located to the left of the waveguide as viewed in the propagation direction of an electromagnetic wave, the phase of the electromagnetic wave is advanced by ⅛ of the wavelength (or by 45 degrees).

In the example illustrated in FIG. 1, when an electromagnetic wave propagates in the first direction (or toward the positive side of the X axis in FIG. 1), the non-reciprocal member 40 is located to the right of the first waveguide 21 in the first direction. At the same time, the non-reciprocal member 40 is located to the left of the second waveguide 22 in the first direction. Accordingly, the phase of an electromagnetic wave propagating in the first direction is delayed by 45 degrees in the first waveguide 21, and is advanced by 45 degrees in the second waveguide 22. As described above, the isolator 10 is configured in such a way that in the absence of the non-reciprocal member 40, the phase of an electromagnetic wave propagating through the first waveguide 21 in the first direction is advanced by 90 degrees with respect to the phase of an electromagnetic wave propagating through the second waveguide 22 in the first direction. Therefore, the phase of an electromagnetic wave propagating through the first waveguide 21 in the first direction is advanced by 45 degrees, and the phase of an electromagnetic wave propagating through the second waveguide 22 in the first direction is advanced by 45 degrees. This means that the difference between the phase shift of an electromagnetic wave propagating through the first waveguide 21 in the first direction and the phase shift of an electromagnetic wave propagating through the second waveguide 22 in the first direction is 0 degrees. That is, the phase shift of an electromagnetic wave propagating through the first waveguide 21 in the first direction and the phase shift of an electromagnetic wave propagating through the second waveguide 22 in the first direction are the same.

On the other hand, when an electromagnetic wave propagates in the second direction (or toward the negative side of the X axis in FIG. 1), the non-reciprocal member 40 is located to the left of the first waveguide 21 in the second direction. At the same time, the non-reciprocal member 40 is located to the right of the second waveguide 22 in the second direction. Accordingly, the phase of an electromagnetic wave propagating in the second direction is advanced by 45 degrees in the first waveguide 21, and is delayed by 45 degrees in the second waveguide 22. As described above, the isolator 10 is configured in such a way that in the absence of the non-reciprocal member 40, the phase of an electromagnetic wave propagating through the first waveguide 21 in the second direction is advanced by 90 degrees with respect to the phase of an electromagnetic wave propagating through the second waveguide 22 in the second direction. Therefore, the phase of an electromagnetic wave propagating through the first waveguide 21 in the second direction is advanced by 135 degrees, and the phase of an electromagnetic wave propagating through the second waveguide 22 in the second direction is delayed by 45 degrees. This means that the difference between the phase shift of an electromagnetic wave propagating through the first waveguide 21 in the second direction and the phase shift of an electromagnetic wave propagating through the second waveguide 22 in the second direction is 180 degrees.

In the isolator 10 configured as described above, the phase difference between an electromagnetic wave propagating through the first waveguide 21 and an electromagnetic wave propagating through the second waveguide 22 is 0 degrees during propagation in the first direction, whereas it is 180 degrees during propagation in the second direction. The isolator 10 is thus configured to allow transmission of an electromagnetic wave propagating in the first direction and block transmission of an electromagnetic wave propagating in the second direction.

In the isolator 10, the waveguides and the non-reciprocal member 40 are disposed above the substrate 50 having a substrate surface 50A. The substrate 50 may contain a conductor such as metal, a semiconductor such as silicon, glass, or resin. Although the substrate 50 is a silicon (Si) substrate in the present embodiment, it may be made of various other materials.

The substrate 50 is provided with a buried oxide (BOX) layer 52 on the substrate surface 50A. The BOX layer 52 is formed by an insulator, such as a silicon oxide film. The waveguides are disposed on the BOX layer 52. The substrate 50 is further provided with an insulating layer 54 on the waveguides. The substrate 50 is further provided with the electronic circuits 60 on the BOX layer 52, or in or on the insulating layer 54.

The substrate 50 is further provided with a groove 30 disposed in the insulating layer 54 in such a way as to expose at least part of the waveguides. The groove 30 extends along the waveguides. The groove 30 includes a bottom portion and a side portion in cross-section (see FIG. 2) as viewed in the direction (or X axis direction in FIG. 1) in which the groove 30 extends. The bottom portion of the groove 30 may be disposed in the BOX layer 52 as illustrated in FIG. 2, or may be disposed at substantially the same position as the lower surfaces of the waveguides (or the upper surface of the BOX layer 52).

The substrate 50 is further provided with the non-reciprocal member 40 covering the insulating layer 54, the groove 30, and the waveguides exposed in the groove 30. The non-reciprocal member 40 is formed by deposition over the substrate 50, and is disposed on the bottom and side portions of the groove 30 and the upper surface of the insulating layer 54. In the groove 30 extending along the first waveguide 21 and the second waveguide 22, the non-reciprocal member 40 is in contact with the side faces of the first waveguide 21 and the second waveguide 22.

The waveguides are surrounded by the BOX layer 52, the insulating layer 54, and the non-reciprocal member 40. The waveguides may be collectively referred to as a core. The BOX layer 52 and the insulating layer 54 may be collectively referred to as a cladding. The core and the cladding may contain a dielectric material. The waveguides are also referred to as dielectric lines. The materials of the core and the cladding are determined in such a way that the relative dielectric constant of the core is greater than the relative dielectric constant of the cladding. In other words, the materials of the core and the cladding are determined in such a way that the refractive index of the cladding is greater than the refractive index of the core. With this configuration, all electromagnetic waves propagating through the core can be reflected off the boundary between the core and the cladding. This can reduce loss of electromagnetic waves propagating through the core.

The relative dielectric constants of the core and the cladding may be greater than the relative dielectric constant of air. When the relative dielectric constants of the core and the cladding are greater than the relative dielectric constant of air, leakage of electromagnetic waves from the isolator 10 can be suppressed. This can reduce loss of electromagnetic waves caused by emission from the isolator 10.

Although the waveguides serving as a core are made of silicon (Si) in the present embodiment, they may be made of various other materials. Although the BOX layer 52 and the insulating layer 54 serving as a cladding are made of quartz glass or silicon oxide films ($SiO_2$) in the present embodiment, they may be made of various other materials. Silicon and quartz glass have relative dielectric constants of about 12 and about 2, respectively. Silicon is capable of allowing low-loss propagation of an electromagnetic wave having a near-infrared wavelength of about 1.2 µm to about 6 µm. A silicon waveguide is capable of allowing low-loss propagation of an electromagnetic wave having a wavelength in the 1.3 µm band or the 1.55 µm band used in optical communications.

Although cerium-substituted yttrium iron garnet (Ce:YIG) is used to make the non-reciprocal member 40 in the present embodiment, the non-reciprocal member 40 may be made of a transparent magnetic material, such as bismuth-substituted YIG (Bi:YIG), which is a partially substituted YIG. Various other magnetic materials may be used to make the non-reciprocal member 40.

The non-reciprocal member 40 made of a YIG-based material exhibits sufficient non-reciprocity by being well crystallized. The crystallization of the non-reciprocal member 40 is promoted by heating the non-reciprocal member 40 to a predetermined temperature or higher. However, considering the influence on the waveguides and other components, such as wiring lines, formed on the substrate 50, it is difficult to heat the entire substrate 50 to a predetermined temperature or higher during deposition of the non-reciprocal member 40. Accordingly, the non-reciprocal member 40 deposited in the groove 30 without heating the substrate 50 is not well crystallized, and does not exhibit sufficient non-reciprocity.

To crystallize the non-reciprocal member 40 in the isolator 10 of the present embodiment, the non-reciprocal member 40 is heated by laser irradiation. The laser light used here is light having a wavelength at which the non-reciprocal member 40 efficiently absorbs the light. Since the non-reciprocal member 40 made of Ce:YIG is capable of efficiently absorbing visible light, a visible-light laser may be used to heat the non-reciprocal member 40.

Non-reciprocity exhibited by the non-reciprocal member 40 may influence not only the phase of an electromagnetic wave propagating through the waveguide, but also the operation of the electronic circuit 60. In the isolator 10 of the present embodiment, a portion of the non-reciprocal member 40 disposed in an area of influence 62 including the electronic circuit 60 is configured to exhibit no non-reciprocity or to exhibit only weak non-reciprocity. On the other hand, a portion of the non-reciprocal member 40 in contact with the waveguide is configured to exhibit non-reciprocity required to advance or delay, by a predetermined value (e.g., 45 degrees), the phase of an electromagnetic wave propagating through the waveguide.

The portion of the non-reciprocal member 40 in contact with the waveguide and configured to exhibit necessary non-reciprocity is also referred to as a first portion 41. The portion of the non-reciprocal member 40 disposed in the area of influence 62 including the electronic circuit 60 and configured not to exhibit non-reciprocity strong enough to influence the electronic circuit 60 is also referred to as a second portion 42. The second portion 42 corresponds to the portion of the non-reciprocal member 40 configured to exhibit no non-reciprocity or to exhibit only weak non-reciprocity. In other words, non-reciprocity exhibited in the portion of the non-reciprocal member 40 (or second portion 42) disposed within a predetermined range from the electronic circuit 60 (or disposed in the area of influence 62) is weaker than non-reciprocity exhibited in the portion of the non-reciprocal member 40 (or first portion 41) in contact with the waveguide.

When the non-reciprocal member 40 is heated by laser irradiation in the isolator 10 of the present embodiment, the non-reciprocal member 40 is partially irradiated with laser light in such a way that the non-reciprocal member 40 includes the first portion 41 and the second portion 42. To allow crystallization of the first portion 41 and block crystallization of the second portion 42, the first portion 41 of the non-reciprocal member 40 deposited over the substrate 50 is irradiated with laser light. The non-reciprocal member 40 can thus be selectively crystallized. This can reduce the influence of the crystallized first portion 41 of the non-reciprocal member 40 on the electronic circuit 60.

Heating the non-reciprocal member 40 may increase the temperature of the electronic circuit 60. The increase in the temperature of the electronic circuit 60 may change the characteristics of the electronic circuit 60. That is, heating the non-reciprocal member 40 may influence the electronic circuit 60. The temperature of the electronic circuit 60 does not increase easily when the area of influence 62 including the electronic circuit 60 is not irradiated with laser light. In other words, selective laser irradiation can reduce the influence on the electronic circuit 60.

The isolator 10 may include a mask that blocks or attenuates laser light in such a way that the non-reciprocal member 40 is irradiated with laser light at the first portion 41 but not at the second portion 42. The mask may be made of metal, such as aluminum, in such a way that the transmittance of laser light passing therethrough is less than a transmittance threshold.

As described above, in the isolator 10 of the present embodiment, the non-reciprocal member 40 is selectively heated in such a way that the influence on elements, including the electronic circuit 60, disposed on the substrate 50 can be reduced. Therefore, even when a material that requires heating is used to make the non-reciprocal member 40, the influence on elements, including the electronic circuit 60, disposed on the substrate 50 can be reduced.

Figure 3:
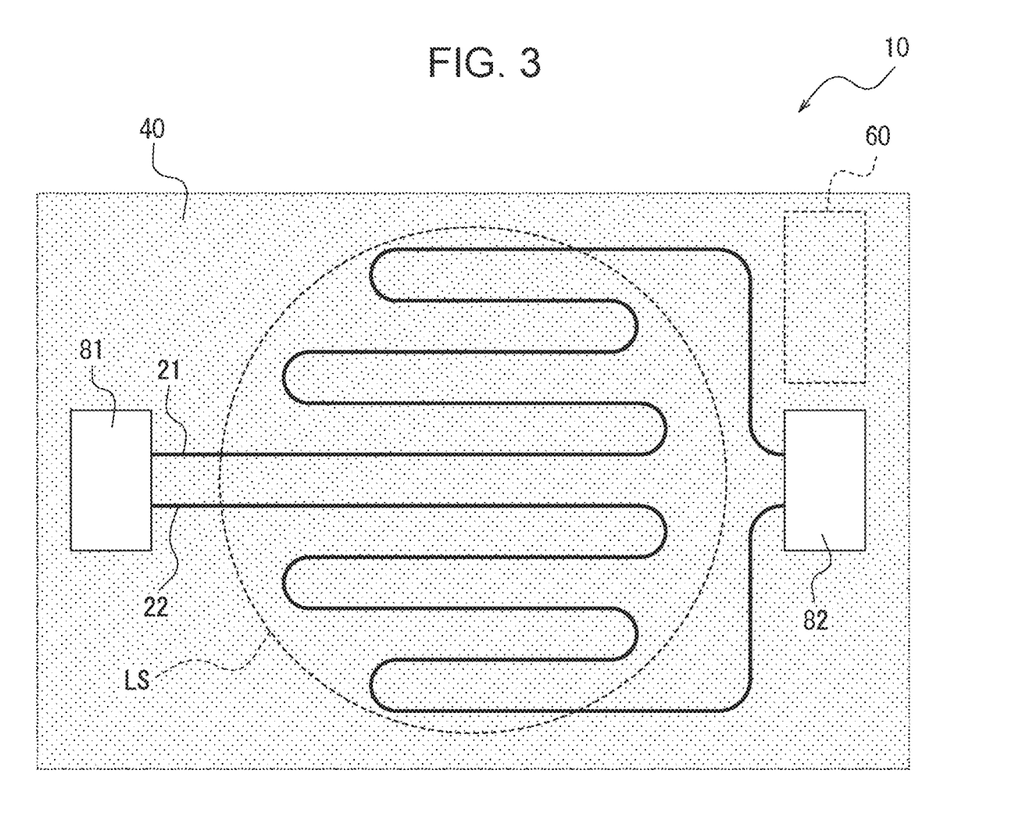
FIG. 3 is a plan view illustrating an exemplary configuration where waveguides are arranged in a meandering pattern in a substantially circular laser irradiation region.

As illustrated in FIG. 3, the first waveguide 21 and the second waveguide 22 may each be arranged in a meandering pattern. In other words, the direction in which the waveguides extend may change at multiple points. The waveguides may be arranged in a meandering pattern in a substantially circular region. The waveguides may be arranged inside a substantially circular laser irradiation region LS. This allows effective use of laser light for heating the non-reciprocal member 40. The elements, including the electronic circuit 60, may be disposed outside the laser irradiation region LS. This can reduce the influence of laser irradiation on the elements, including the electronic circuit 60, disposed on the substrate 50.

Figure 4:
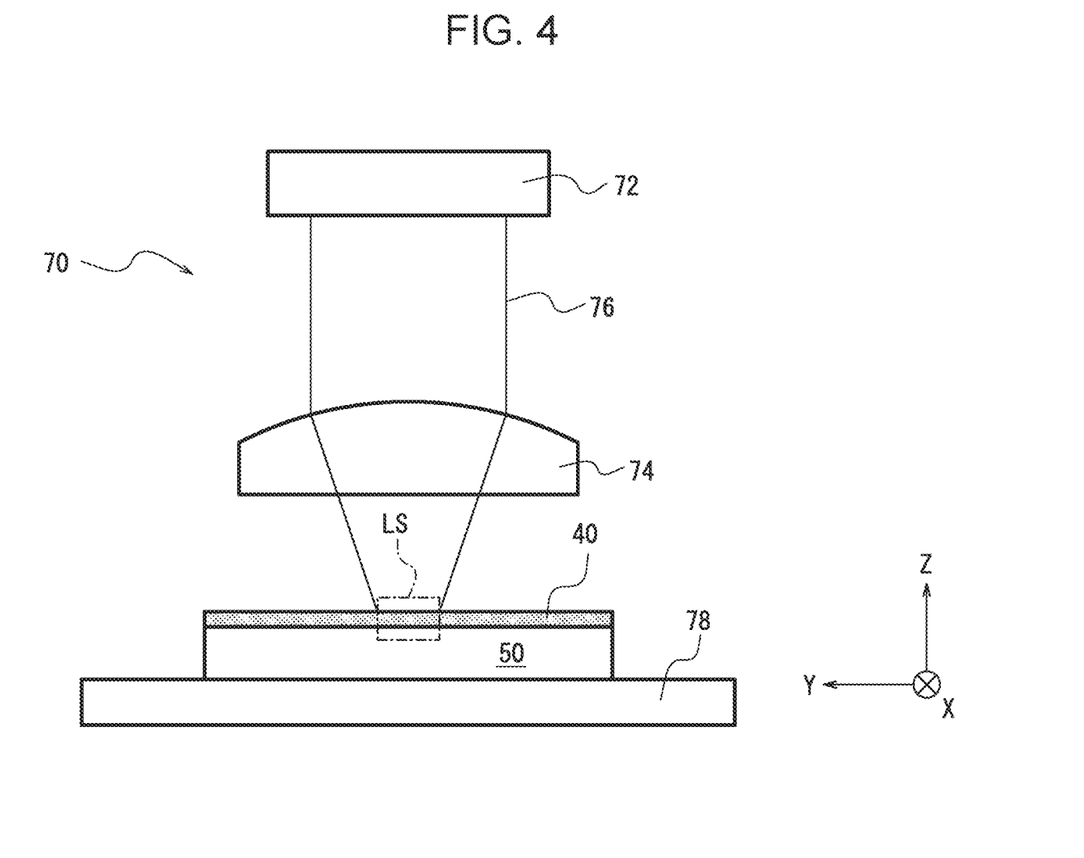
FIG. 4 is a lateral view illustrating an exemplary configuration for laser irradiation.

As illustrated in FIG. 4, an irradiation device 70 may be used to irradiate, with laser light, the non-reciprocal member 40 in the isolator 10 of the present embodiment. The irradiation device 70 includes a laser source 72, a lens 74, and a stage 78. The stage 78 is configured to hold the substrate 50 placed thereon. The laser source 72 emits laser light 76. The laser light 76 is converged by the lens 74. After being converged, the laser light 76 enters and heats the non-reciprocal member 40 disposed over the substrate 50 placed on the stage 78. A region on the substrate 50 irradiated with the laser light 76 is denoted by LS. The stage 78 is configured to allow the position of the substrate 50 to be controlled along an XY plane. The irradiation device 70 controls the position of the substrate 50 on the stage 78, controls emission of the laser light 76 from the laser source 72, and thus controls the region of irradiation with the laser light 76 with respect to the substrate 50.

The laser light 76 may be pulsed laser light or continuous wave laser (CW laser) light. When the laser light 76 is pulsed laser light, a large amount of energy can be applied to the non-reciprocal member 40 in a short time. This increases the temperature of the non-reciprocal member 40 before escape of heat into the substrate 50, and efficiently heats the non-reciprocal member 40. For example, the conditions of pulsed laser light may be as follows.

Wavelength: 532 nanometers (nm)
Scanning speed: 100 micrometers per second (μm/s) to 10 millimeters per second (mm/s)
Diameter of laser irradiation spot: 1 micrometer to 1000 micrometers (μm)
Output average power: 0.1 watts to 10 watts (W)

When the substrate 50 is heated in the atmosphere, elements above the substrate 50, such as the waveguides or the electronic circuit 60, may be oxidized. To protect the elements included in the substrate 50 from oxidation, the irradiation device 70 may further include a vacuum chamber for accommodating the stage 78 configured to hold the substrate 50 placed thereon. The laser source 72 or the lens 74 may be installed inside the vacuum chamber, or outside the vacuum chamber. When the laser source 72 or the lens 74 is installed outside the vacuum chamber, the vacuum chamber may include a window that allows transmission of the laser light 76 therethrough.

<Identifying Conditions of Non-Reciprocal Member 40>

Figure 5:
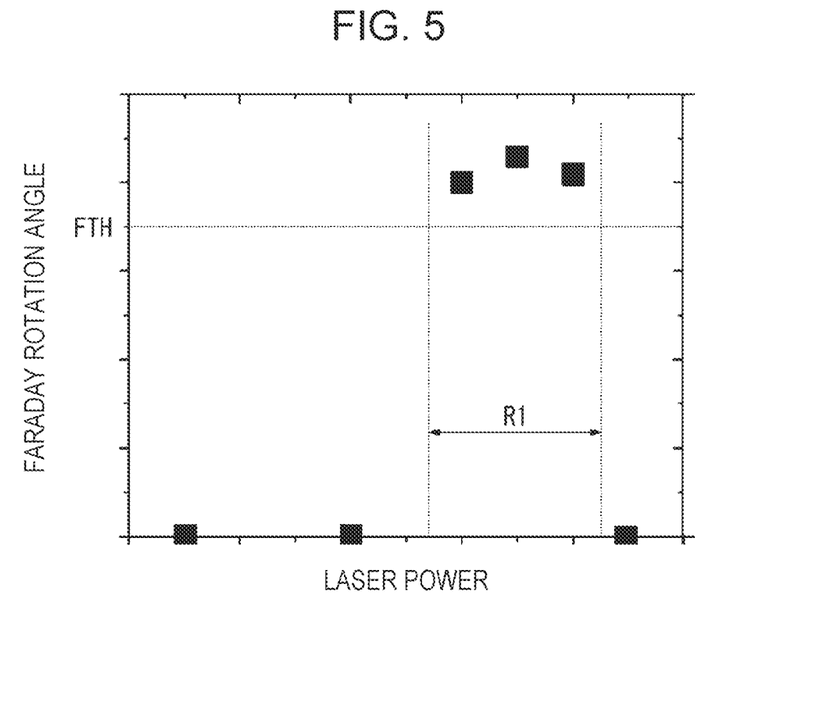
FIG. 5 is a graph showing a relation between laser power for irradiating a non-reciprocal member and a Faraday rotation angle of the non-reciprocal member irradiated with laser light.
Figure 6:
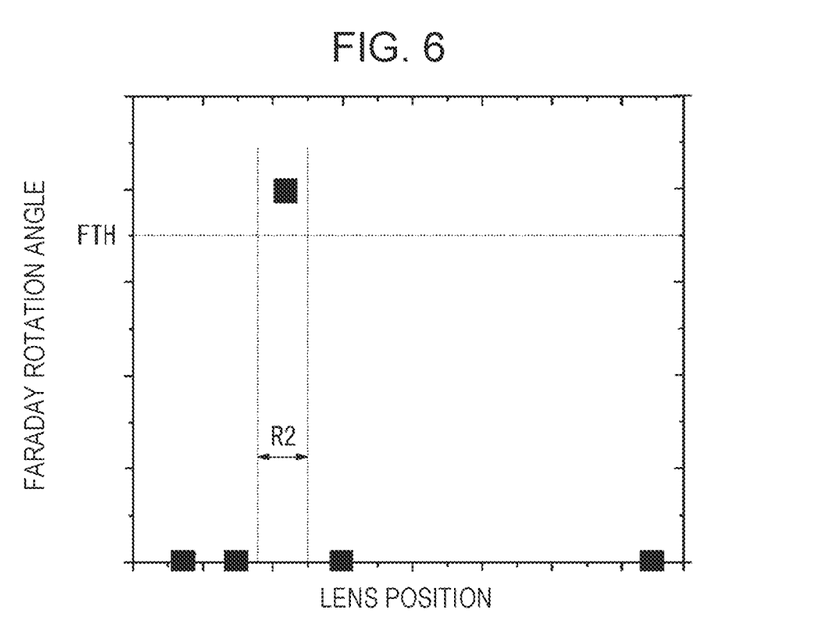
FIG. 6 is a graph showing a relation between a lens position for irradiating the non-reciprocal member and a Faraday rotation angle of the non-reciprocal member irradiated with laser light.

The conditions of the non-reciprocal member 40 may be identified by a measured Faraday rotation angle. The greater the measured Faraday rotation angle of the non-reciprocal member 40, the stronger the non-reciprocity exhibited by the non-reciprocal member 40. As illustrated in FIG. 5 and FIG. 6, the measured Faraday rotation angle varies depending on the power of the laser light 76 or the position of the lens 74. The vertical axes in FIG. 5 and FIG. 6 represent a measured Faraday rotation angle of the non-reciprocal member 40. The horizontal axis in FIG. 5 represents the power of the laser light 76. The horizontal axis in FIG. 6 represents the position of the lens 74.

The higher the power of the laser light 76, the higher the temperature of the non-reciprocal member 40 measured when the non-reciprocal member 40 is irradiated with the laser light 76. The closer the focal position of the lens 74 to the non-reciprocal member 40 measured when the laser light 76 is converged by the lens 74, the more efficient the use of power of the laser light 76 for heating the non-reciprocal member 40 and the higher the temperature of the non-reciprocal member 40.

Specifically, as in FIG. 5, when the power of the laser light 76 is within a range indicated by R1, the Faraday rotation angle of the non-reciprocal member 40 is greater than or equal to a threshold indicated by FTH. As in FIG. 6, when the position of the lens 74 is within a range indicated by R2, the Faraday rotation angle of the non-reciprocal member 40 is greater than or equal to the threshold indicated by FTH. The graphs of FIG. 5 and FIG. 6 show that when the irradiation conditions of the laser light 76 from the irradiation device 70 are properly set and the temperature of the non-reciprocal member 40 is increased to a level within a predetermined range, the non-reciprocal member 40 is sufficiently crystallized and the Faraday rotation angle of the non-reciprocal member 40 becomes greater than or equal to the threshold.

Figure 7:
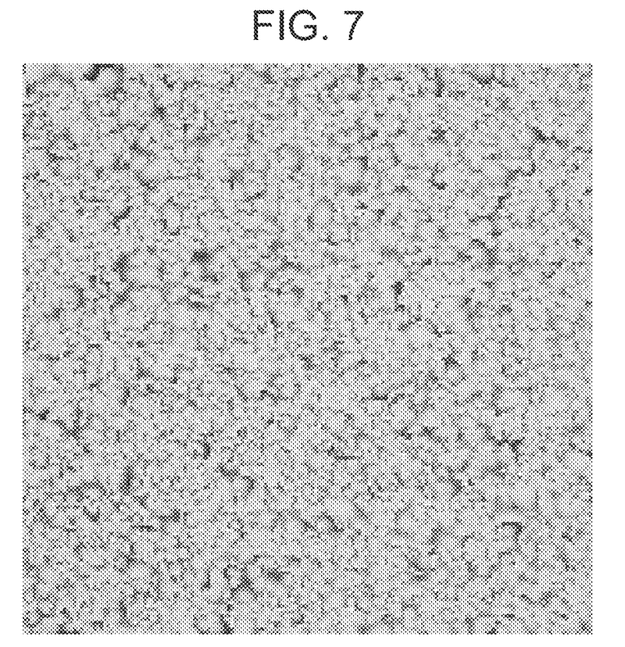
FIG. 7 gives an exemplary photographic image of a surface of the non-reciprocal member with a large Faraday rotation angle.

As in the exemplary photographic image in FIG. 7, when the Faraday rotation angle is greater than or equal to the threshold, the non-reciprocal member 40 is crystallized substantially uniformly when crystallized sufficiently. "Crystallized substantially uniformly" means that the proportion of crystals with sizes greater than or equal to a predetermined size is higher than or equal to a predetermined value. In other words, there are only small variations in size among crystals contained in the non-reciprocal member 40.

Figure 8:
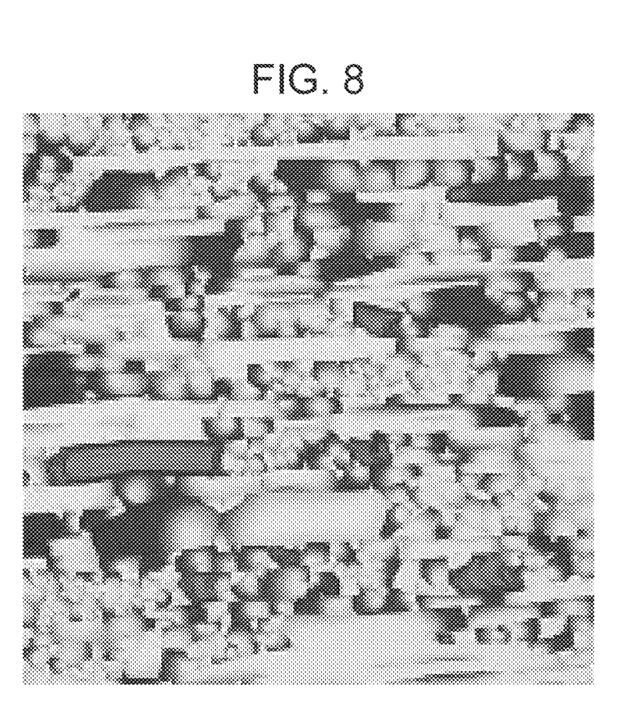
FIG. 8 gives an exemplary photographic image of the surface of the non-reciprocal member with a small Faraday rotation angle.

If the temperature of the non-reciprocal member 40 does not sufficiently increase (or the temperature is too low), the Faraday rotation angle of the non-reciprocal member 40 does not increase because of insufficient crystallization of the non-reciprocal member 40. As in the exemplary photographic image in FIG. 8, there are considerable variations in size among crystals contained in the non-reciprocal member 40 not sufficiently crystallized. If the temperature of the non-reciprocal member 40 becomes too high, the resulting structural phase transition of the non-reciprocal member 40 causes a loss of the magneto-optic effect.

Figure 9:
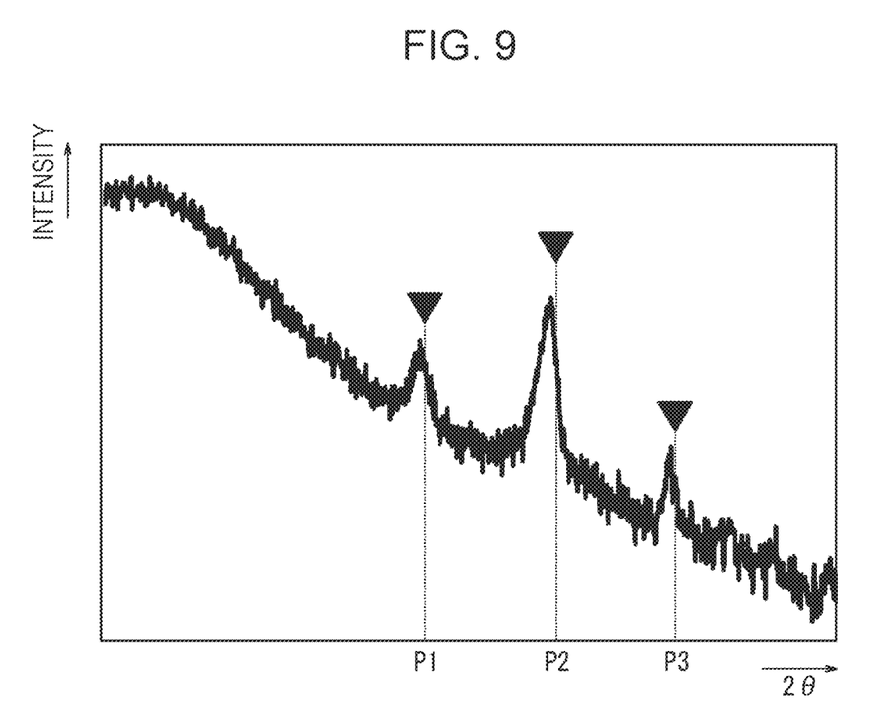
FIG. 9 is a graph showing an exemplary result of XRD measurement of a crystallized non-reciprocal member.

The conditions of crystallization of the non-reciprocal member 40 can be identified by a measurement result obtained by an X-ray diffractometer (or X-ray diffraction (XRD) device). The XRD measurement is based on Bragg's law, $n\lambda = 2d \cdot \sin\theta$, which defines the conditions of X-ray diffraction in a sample (crystals) to be measured. In Bragg's law, d is an interplanar spacing in atomic arrangement of the sample (crystals) to be measured, n is the order of X-rays, λ is the wavelength of characteristic X-rays used in XRD measurement, and θ is the angle of X-rays incident on the surface of the sample (crystals).

An exemplary result of XRD measurement is shown in the graph of FIG. 9, where the horizontal axis represents the diffraction angle (2θ) of X-rays and the vertical axis represents the diffraction intensity. The diffraction angle is an angle formed by the incident direction of the X-rays on the sample and the propagation direction of the X-rays diffracted by the sample. When the non-reciprocal member 40 is a YIG member, a peak appears in the measurement waveform of the non-reciprocal member 40 where crystallization proceeds. The first portion 41 of the non-reciprocal member 40 may be made of either single crystals or polycrystals. If the first portion 41 of the non-reciprocal member 40 is made of polycrystals, the waveform of the XRD measurement result may have three peaks denoted by P1, P2, and P3 as in FIG. 9. If the first portion 41 of the non-reciprocal member 40 is made of single crystals, the waveform of the XRD measurement result may have one peak.

In the present embodiment, the isolator 10 is configured in such a way that the degree of crystallization of the non-reciprocal member 40 is smaller in the second portion 42 than in the first portion 41. The degree of crystallization may be identified by the peak intensity in the XRD measurement waveform. If the peak intensity in the result of measurement of the second portion 42 is lower than the peak intensity in the result of measurement of the first portion 41, the degree of crystallization of the second portion 42 is smaller than the degree of crystallization of the first portion 41. The degree of crystallization of the non-reciprocal member 40 can also be identified by techniques other than XRD. For example, the degree of crystallization of the non-reciprocal member 40 may be identified on the basis of an image of the non-reciprocal member 40 observed with a transmission electron microscope (TEM) with a resolution of the order of sub-nanometers.

The crystallized portion (first portion 41) of the non-reciprocal member 40 may be configured to have a lattice constant different from a lattice constant of a portion of the substrate 50 in contact with the crystallized portion (first portion 41) of the non-reciprocal member 40. In the isolator 10 of the present embodiment, the non-reciprocal member 40 is crystallized after being deposited. Therefore, the lattice constant of the first portion 41 may differ from that of the substrate 50.

The lattice constant of the sample (crystals) can be calculated on the basis of the XRD measurement result. Bragg's law is satisfied at a diffraction angle (2θ) corresponding to a peak diffraction intensity. The lattice constant can be calculated by applying a diffraction angle (2θ) corresponding to a peak to Bragg's law.

The lattice constant of the sample (crystals) can also be identified by techniques other than XRD. For example, the lattice constant of the sample (crystals) can be calculated on the basis of a diffraction image obtained by slicing the sample (crystals) with a focused ion beam (FIB) and irradiating the sliced sample (crystals) with an electron beam from a transmission electron microscope (TEM). The lattice constant of the sample (crystals) can be calculated on the basis of an image of the sample (crystals) observed with a resolution of the order of sub-nanometers. The lattice constant of the sample (crystals) can also be calculated by analyzing X-rays emitted from the sample (crystals) when the sample (crystals) is irradiated with an electron beam.

An amorphous portion of the non-reciprocal member 40 or of the substrate 50 may be interposed between the crystallized portion (first portion 41) of the non-reciprocal member 40 and the substrate 50. XRD measurement can determine whether the portion is amorphous. In the isolator 10 of the present embodiment, the non-reciprocal member 40 is crystallized after being deposited. This means that a crystallized film serving as a seed film for deposition is not required.

Method for Manufacturing Isolator 10

A method for manufacturing the isolator 10 according to the present embodiment will now be described with reference to cross-sectional views of FIG. 10A to FIG. 10C.

Figure 10A:
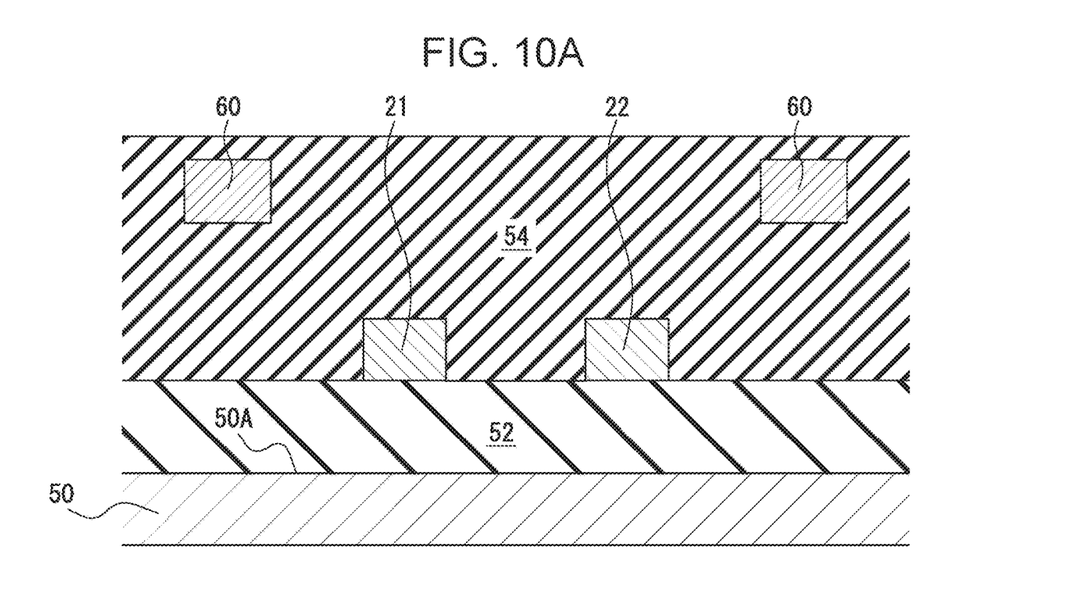
FIG. 10A is a cross-sectional view illustrating a step of forming waveguides, electronic circuits, and an insulating layer above a substrate.

As illustrated in FIG. 10A, the first waveguide 21 and the second waveguide 22 are formed on the BOX layer 52 disposed on the substrate 50. The waveguides may be formed by combination of a depositing step and an etching step. The depositing step may involve plasma chemical vapor deposition (CVD) or sputtering. The etching step may involve dry etching, such as reactive ion etching (RIE), or wet etching. Next, the insulating layer 54 is formed on the first waveguide 21 and the second waveguide 22. The insulating layer 54 may be deposited, for example, by plasma CVD. The electronic circuits 60 are then formed on the BOX layer 52, or in or on the insulating layer 54. The electronic circuits 60 may be formed by a known process of manufacturing semiconductor elements.

Figure 10B:
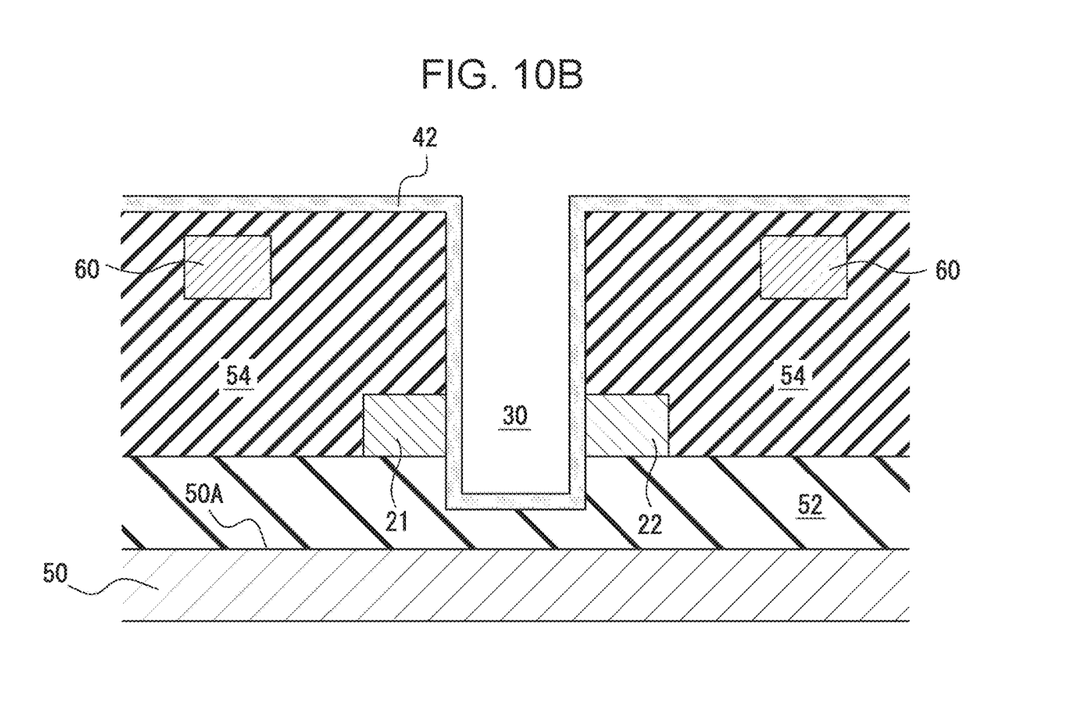
FIG. 10B is a cross-sectional view illustrating a step of forming a groove in the insulating layer in such a way as to expose side faces of the waveguides, and depositing a non-reciprocal member.

As illustrated in FIG. 10B, the groove 30 is formed in the insulating layer 54. The groove 30 may be formed by dry etching. Wet etching may be additionally performed to expose the waveguide at the side portion of the groove 30. Next, the non-reciprocal member 40 is formed in the groove 30 and on the insulating layer 54. The non-reciprocal member 40 may be deposited, for example, by sputtering.

Figure 10C:
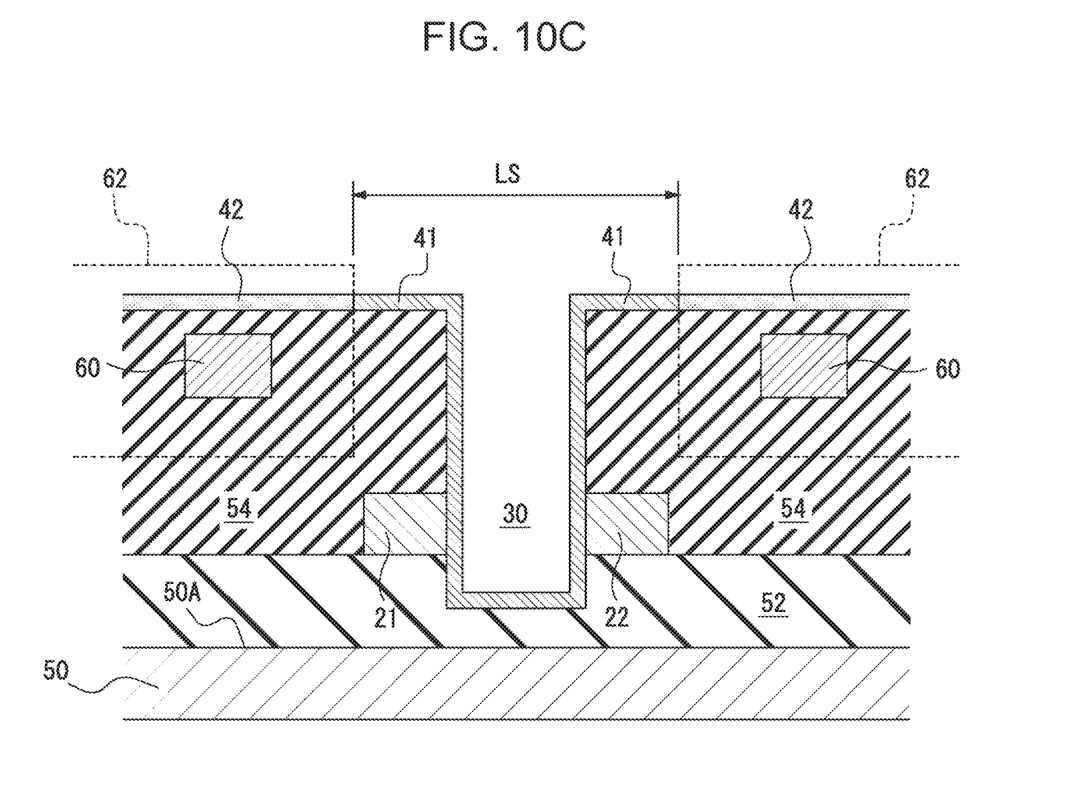
FIG. 10C is a cross-sectional view illustrating a step of irradiating a part of the non-reciprocal member with laser light to crystallize it.

As illustrated in FIG. 10C, the non-reciprocal member 40 is irradiated with laser light in the laser irradiation region LS. The laser irradiation region LS is defined as a range outside the area of influence 62 including the electronic circuit 60. The laser irradiation heats the non-reciprocal member 40. Controlling the temperature of and duration of heating the non-reciprocal member 40 can control the degree of crystallization of the non-reciprocal member 40. A portion of the non-reciprocal member 40 disposed in the laser irradiation region LS corresponds to the first portion 41. Irradiating the first portion 41 of the non-reciprocal member 40 with laser light heats the first portion 41 and promotes crystallization of the first portion 41. A portion of the non-reciprocal member 40 disposed outside the laser irradiation region LS (or disposed inside the area of influence 62) corresponds to the second portion 42. Crystallization of the second portion 42 of the non-reciprocal member 40 does not proceed.

Thus, as described with reference to FIG. 10A to FIG. 10C, the isolator 10 can be produced in such a way that the non-reciprocal member 40 includes the first portion 41 and the second portion 42.

Applications of Isolator 10

The isolator 10 may be used in combination with a component capable of transmitting electromagnetic waves. The isolator 10 may be applied to an optical switch, an optical transceiver, or a data center. For example, the isolator 10 may be applied to an electromagnetic wave transmitter. The electromagnetic wave transmitter includes the isolator 10 and a light source. In the electromagnetic wave transmitter, the isolator 10 receives an electromagnetic wave from the light source and outputs an electromagnetic wave toward a receiver. The isolator 10 is configured in such a way that the transmittance of an electromagnetic wave propagating from the light source toward the receiver is greater than the transmittance of an electromagnetic wave propagating from the receiver toward the light source. This makes it difficult for electromagnetic waves to enter the light source. The light source can thus be protected.

The light source may be a semiconductor laser, such as a laser diode (LD) or a vertical-cavity surface-emitting laser (VCSEL). The light source may include devices configured to emit not only visible light, but also electromagnetic waves of various wavelengths. The light source may be disposed on the substrate 50 of the isolator 10. The isolator 10 may receive a TE mode electromagnetic wave from the light source.

The electromagnetic wave transmitter may further include a modulator and a signal input unit. The modulator carries out modulation by varying the intensity of an electromagnetic wave. The modulator may be interposed between the isolator 10 and the receiver, not between the light source and the isolator 10. For example, the modulator may pulse-modulate an electromagnetic wave. The signal input unit receives a signal input, for example, from an external device. The signal input unit may include, for example, a digital-to-analog (D/A) converter. The signal input unit outputs a signal to the modulator. The modulator modulates an electromagnetic wave on the basis of a signal acquired by the signal input unit.

The light source may include a modulator and a signal input unit. In this case, the light source may output a modulated electromagnetic wave to the isolator 10.

The electromagnetic wave transmitter may be mounted on the substrate 50. The light source may be mounted in such a way as to be connected to the first branching unit 81, with the modulator interposed therebetween. The light source may be mounted in such a way as to be connected to the first branching unit 81, without the modulator interposed therebetween. The receiver may be mounted in such a way as to be connected to the second branching unit 82, without the modulator interposed therebetween. The receiver may be mounted in such a way as to be connected to the second branching unit 82, with the modulator interposed therebetween. In this case, the modulator may be mounted in such a way as to be connected to the second branching unit 82. The light source, the modulator, and the receiver may be included in the electronic circuit 60.

Although embodiments of the present disclosure have been described on the basis of drawings and examples, it is to be noted that various modifications or changes can be made to the present disclosure by any person skilled in the art. Therefore, it is to be noted that these modifications or changes are included in the scope of the present disclosure. For example, functions included in each component can be rearranged in a logically non-contradictory way. A plurality of components may be combined into a single one, or may each be divided into sub-components.

In the present disclosure, the terms such as "first" and "second" are identifiers used to distinguish different components. In the present disclosure, the ordinal numbers, such as "first" and "second", assigned as identifiers to components are interchangeable. For example, "first" and "second" of the first waveguide 21 and the second waveguide 22 are interchangeable. The identifiers are interchanged at the same time. The components are distinguishable even after the identifiers are interchanged. The identifiers may be deleted. Without the identifiers, the components are distinguished with symbols. In the present disclosure, identifiers, such as "first" and "second", are not to be used to interpret the order of the components, or as a basis for the presence of identifiers with smaller ordinal numbers.

In the present disclosure, the X axis, the Y axis, and the Z axis are provided for convenience of explanation, and are interchangeable. In the present disclosure, components have been described using a rectangular coordinate system defined by the X axis, the Y axis, and the Z axis. In the present disclosure, the positional relations of components may not necessarily be orthogonal.

What is claimed is:

1. An isolator comprising:
a substrate;
a waveguide and an electronic circuit disposed above the substrate; and
a non-reciprocal member disposed above the waveguide and the electronic circuit, the non-reciprocal member comprising a first portion in contact with the waveguide, and a second portion disposed within a predetermined range from the electronic circuit,
wherein non-reciprocity in the second portion is weaker than non-reciprocity in the first portion.

2. The isolator according to claim 1, wherein the non-reciprocal member contains yttrium iron garnet (YIG).

3. The isolator according to claim 1, wherein a degree of crystallization in the second portion of the non-reciprocal member is smaller than a degree of crystallization in the first portion of the non-reciprocal member.

4. The isolator according to claim 1, wherein a lattice constant of a crystallized portion of the non-reciprocal member differs from a lattice constant of a portion of the substrate in contact with the crystallized portion of the non-reciprocal member.

5. The isolator according to claim 4, wherein an amorphous portion of the non-reciprocal member or of the substrate is interposed between the crystallized portion of the non-reciprocal member and the substrate.

6. The isolator according to claim 1, wherein in a crystallized portion of the non-reciprocal member, a proportion of crystals with sizes greater than or equal to a predetermined size is higher than or equal to a predetermined value.

* * * * *